United States Patent Office.

JOHN H. CHEEVER, OF NEW YORK, N. Y., ASSIGNOR TO THE OKONITE COMPANY, OF SAME PLACE.

PROTECTIVE COVERING FOR ELECTRIC CABLES.

SPECIFICATION forming part of Letters Patent No. 431,104, dated July 1, 1890.

Application filed March 19, 1890. Serial No. 344,553. (No model.)

*To all whom it may concern:*

Be it known that I, JOHN H. CHEEVER, of the city of New York and State of New York, have invented a new and useful Improvement in Protective Coverings for Electric Cables, which improvement is fully set forth in the following specification.

This invention has reference to the construction of electric cables or multiple electric conductors, and more particularly to the tube or sheath, which constitutes the outside covering and protection to the group of inclosed wires. As at present practiced, this sheath or covering is usually formed either of lead or of a compound containing rubber. The general demand is for a lead-incased cable, which is regarded as of superior merit and utility. Moreover, the manufacture of such cables is easily carried on, owing to the facility with which the lead casing can be formed around the group of conductors by the well-known operation of the pipe-press. Ordinary rubber compounds cannot with certainty be applied in the same way, as they lack those properties which enable lead to be easily worked. Ordinarily the rubber coverings are applied by winding a strip of the unvulcanized compound on a backing of cloth around the cable, and then vulcanizing the rubber.

The object of the present invention is the production of a cable covered with a compound, either vulcanized or not, as preferred, having the appearance and useful properties of a lead sheathing, and having also other advantageous characteristics that do not appertain to that metal.

The compound which I employ is preferably composed of eleven parts, by weight, of rubber, nine parts of plumbago, nine parts of asbestus, and two parts of sulphur. The materials are mixed in any suitable mill, so as to produce uniformity in the mass, and after application to the exterior of the conductor, as hereinafter pointed out, the compound may be vulcanized in a manner well understood.

The compound described resembles lead in the important respect that it may with facility be applied to a cable by the operation of the core and die of a pipe-press, thus producing a continuous seamless sheath of a rubber compound of any desired length, which hitherto it has been difficult to realize in practice. Moreover, after being squeezed through the die of a pipe-press, the surface of the compound acquires a metallic luster, which gives it an appearance resembling lead pipe.

The compound described has the property of high electrical resistance, and is not subject to corrosion. It is also capable of resisting a high degree of heat, on which account it is eminently suitable as a covering for conductors used for conveying high-tension currents. In these respects the compound is superior to lead for the purposes of the invention.

The proportions of the several ingredients as given above produce a compound which is found very effective as a cable-covering; but it will be understood that the said proportions may be varied within certain limits without departing from the spirit of the invention.

I claim as my invention—

1. As a covering for electric conductors or cables, the within-described compound of rubber, plumbago, asbestus, and sulphur, in substantially the proportions set forth.

2. An electric cable having a continuous seamless covering composed of rubber, plumbago, asbestus, and sulphur, substantially as described.

In testimony whereof I have signed this specification in the presence of two subscribing witnesses.

JOHN H. CHEEVER.

Witnesses:
VICTOR E. BURKE,
ROBERT J. CUMMINGS.